Nov. 16, 1948.  H. J. VAN DEN BERGE ET AL  2,453,950
WELDING DEVICE

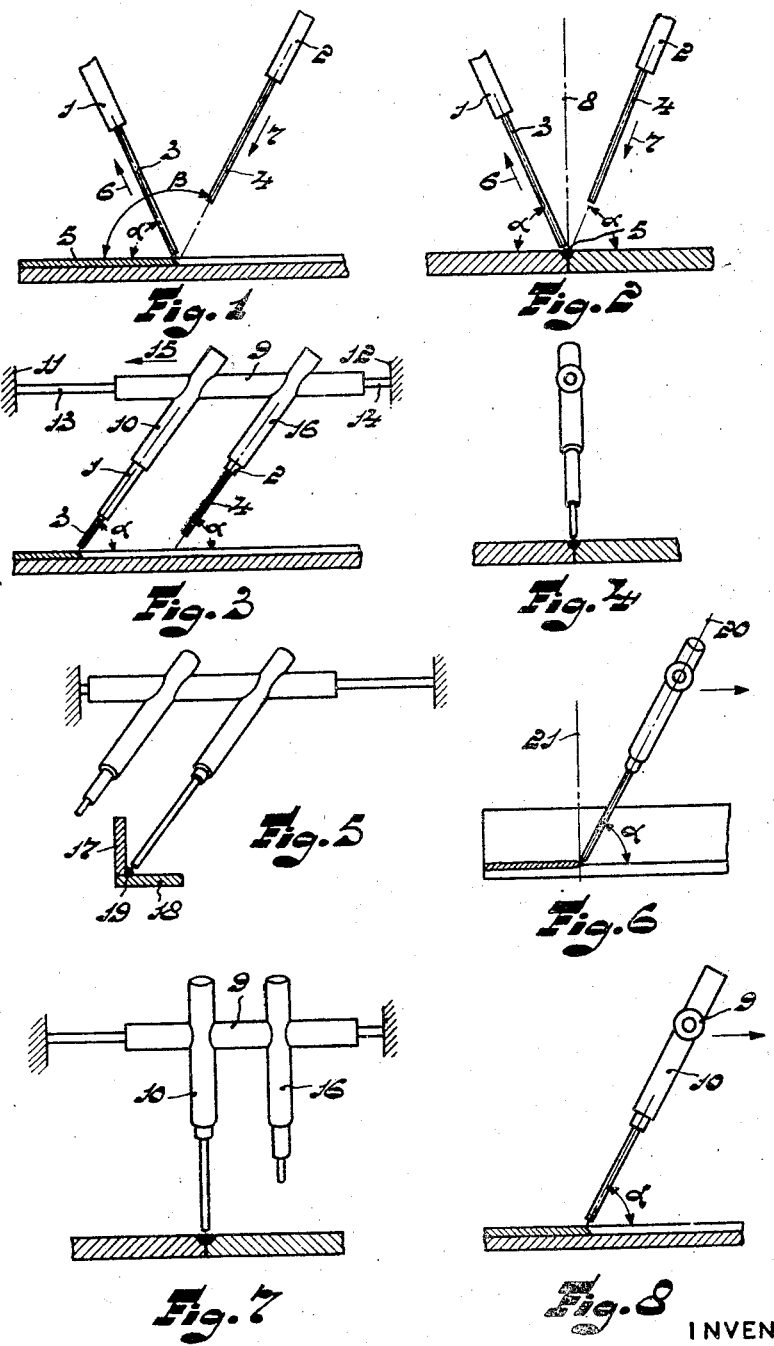

Filed Oct. 24, 1946  2 Sheets-Sheet 2

INVENTORS
HENDRIK JAN VAN DEN BERGE & HENDRIK PIETER HUBEE
BY
ATTORNEY.

Patented Nov. 16, 1948

2,453,950

UNITED STATES PATENT OFFICE 2,453,950

WELDING DEVICE

Hendrik Jan van den Berge and Hendrik Pieter Hubee, Eindhoven, Netherlands, assignors to Hartford National Bank and Trust Company, Hartford, Conn., as trustee Application October 24, 1946, Serial No. 705,276
In the Netherlands July 21, 1945

7 Claims. (Cl. 219—8)

Welding devices are known of the type comprising two holders for welding rods which, together with the work-piece, enclose certain angles and which automatically take the place of each other during welding the device operating in such a manner that the welding seam is automatically continued by a new welding rod at the place, at which the welding seam was finished by the welding rod that is meanwhile consumed.

In this known device the two holders taking the place of each other are mutually arranged at a certain angle so as to form an upright V with respect to the welding seam. This will be explained more fully in the description of the figures of the drawing.

According to the invention, the two holders for the welding rods are fixed in parallel or substantially in parallel to a device allowing such a movement that one holder may be brought into the same position and to the same place as the other holder.

With respect to the device of known type we thus obtain the advantage that the welding operation always takes place under the same conditions, since the angle which exists between the welding seam and the welding rod is always the same and is, in addition, also spatially unvaried. True in a known device it is also possible always to obtain the same angle between the welding seam and the welding rod, but these angles are spatially reflecting images of each other.

When use is made of the device according to the invention, the place of the holder comprising the welding rod which is consumed and must be replaced is taken as precisely as possible by the other holder comprising a new welding rod, so that differences in the welding properties are fundamentally avoided.

The present invention is of essential importance for so-called touch-welding, since the properties of the weld are in this case greatly influenced by the position of the holder comprising the welding rod with respect to the welding seam.

Consequently, in touch-welding the most satisfactory results are obtained with the device according to the invention. The above-described device of known type is not suitable for this purpose.

According to a further characteristic of the invention, the automatic exchange of the two holders, including the movement of the above-mentioned device fixed thereto, is effected by pneumatic means, for which purpose use may be made of a simple mechanism. The operation of such a mechanism and more particularly the sequence of the movements of the welding-rod holders and of the device may be controlled wholly or in part by electric means.

The invention will be explained more fully with reference to the accompanying drawing showing diagrammatically, by way of example, a few embodiments thereof.

In the drawing,

Figure 1 shows a device incorporating the arrangement of welding rods which is known in the art;

Fig. 2 is an alternate arrangement of the device shown in Figure 1 and is also known;

Fig. 3 shows a device embodying the present invention;

Fig. 4 is a side view of the device illustrated in Fig. 3;

Fig. 5 is a modified form of the invention;

Fig. 6 is a side view of Fig. 5;

Fig. 7 is another modified form of the invention;

Fig. 8 is a side view of Fig. 7; and

Figure 9:
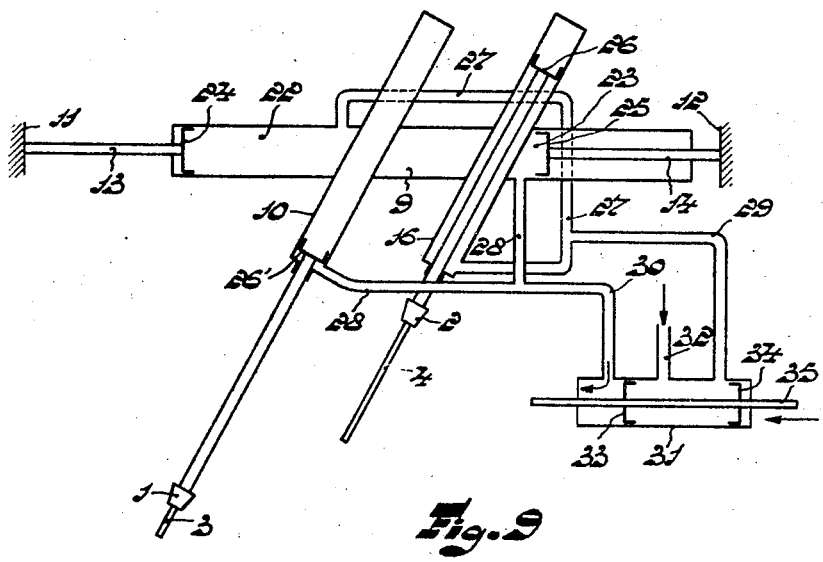
Fig. 9 shows an arrangement for operating the device of the present invention pneumatically.

Now describing the drawing in detail,

Figure 1 shows a device of known type in which two holders 1 and 2 for welding rods 3 and 4 automatically take the place of each other during welding. The two holders comprising the welding rods form an upright V with respect to the welding seam 5. The welding rod 3, by means of which the welding operation is effected, and the welding seam 5 make an angle α. When this rod is consumed, the holder 1 is automatically pushed upwards in the direction of the arrow 6, the holder 2 subsequently being pushed downwards in the direction of the arrow 7 so that rod 4 takes the place of rod 3 at the point at which the welding seam 5 was finished. Now, however, the angle made between the welding seam 5 and the rod 4 is considerably larger than the angle α with the result that troublesome differences in the welding properties may arise.

With the method illustrated in Figure 2 this may also be the case. The difference with respect to Figure 1 consists in that the welding device is turned by 90° with respect to the work-piece having the seam to be welded. It is true that in this way equal angles α are always enclosed between the work-piece and the rods 3 and 4—and this also applies to the angles made by the welding seam, which in this case extends at right angles to the plane of the drawing, and the rods 3 and 4—but these angles do not spatially occupy the same place, since they are reflecting images of each other with respect to the axis of symmetry 8.

Figure 3 shows the device according to the invention as stated hereinbefore.

The two holders 1 and 2 for the welding rods 3 and 4 are fixed in parallel to a device 9, allowing of such a movement that one holder, for example holder 2, may be brought into the same position and to the same place as the other holder 1. After the rod 3 is consumed, the holder 1 in the cylinder 10 is pushed upwards whilst the device 9 mounted on guide rods 13 and 14, secured to two fixed points 11 and 12, is displaced in the direction of the arrow 15 to such an extent that the cylinder 16 spatially occupies the same place as the cylinder 10. Furthermore, the holder 2 moves downwards to such an extent that the welding rod 4 reaches the place at which the welding seam 5 was finished by the consumed welding rod 3. In this case the angle α is always the same and also spatially unvaried.

It will be explained more fully with reference to Figure 9, in what manner these movements take place automatically.

Figure 4 is a side-view of the device shown in Figure 3 as stated hereinbefore.

The construction of the device according to the invention may alternatively be modified in such a manner that the plane comprising the device 9 and the cylinders 10 and 16, instead of being located in the plane of the drawing, makes an angle with it. This is illustrated in Figures 5 and 6. The work-piece is constituted by a corner piece constituted by two plates 17 and 18, which are welded together at 19. As can be seen from the side-view in Figure 6, the said plane, which is designated 20, makes an angle with the plane of drawing 21 in Figure 5. As before, the angle which exists between the welding rod and the welding seam is, indicated by α.

Figures 7 and 8 show a modified construction in which the cylinders 10 and 16 are at right angles to the device 9.

In conclusion, Figure 9 shows in what manner the device according to the invention may be operated pneumatically as stated hereinbefore.

The device 9 is constituted by a cylinder and two mutually separate sections of which the portions 22 and 23 contain pistons 24 and 25 respectively, which are connected, by means of rods 13 and 14, to portions 11 and 12 respectively of the housing of the apparatus.

Consequently, the device 9 may be displaced either to the left, or to the right. To enable this, a portion of the tube system shown is constituted, for example, by rubber tube.

The welding-rod holders 1 and 2 are connected to pistons 26 and 26', which can be moved in the cylinders 10 and 16 respectively.

Section 22 communicates with the cylinder 16 by means of a tube 27, whereas section 23 communicates with the cylinder 10 through a tube 28.

Tubes 27 and 28 have conduits 29 and 30 respectively, both of which communicate with an open cylinder 31, which is firmly arranged. A supply conduit 32 for compressed air is provided at the center of this cylinder.

The cylinder contains two pistons 33 and 34, which are interconnected by means of a rod 35 and which may be jointly moved backward and forward.

In the position shown, compressed air is supplied, through the conduits 32 and 29, to the section 22 and to the cylinder 16 respectively. Consequently, the section 22 is adjusted to its maximum volume so that the device 9 is displaced as much as possible to the right and the piston 26 of the cylinder 16 is kept in its uppermost position under the action of the compressed air.

The section 23 and the cylinder 10 communicate with the atmosphere through the tubes 28 and 30. Consequently, the piston 26', together with the holder 1 and the welding rod 3, can move downwards under the action of gravity (assisted, as the case may be, by additional spring pressure or additional compressed air), in which case the welding rod bears on the work-piece to be welded. When the rod 3 is substantially consumed, the rod 35 and the pistons 33 and 34 are displaced to the left to such an extent that the conduit 29 communicates with the atmosphere and the conduit 30 communicates with the supply conduit 32. This displacement requires very little energy, the pressure exerted on the two pistons 33 and 34 being equal.

Owing to this step, the pressure in the section 22 and under the piston 26 disappears with the result that this piston begins to fall under the action of gravity. At the same time the device is, however, displaced to the left, since the section 23 tends to adjust itself to its maximum volume. The air contained in the section 22 is thus driven away and blown into the atmosphere.

In this way it is possible for the cylinder 16 to take exactly the place of the cylinder 10.

Owing to the pressure brought under the piston 25 through the conduits 30 and 28, this piston, together with the holder 1 and the consumed welding rod 3, has in the meantime been pushed upwards out of reach of the workpiece and now a new welding rod may be fixed in the holder 1.

The whole of the device may be moved across the workpiece, for example, by means of a suitable motor, so that even very long seams may be welded automatically without difficulty.

The control of the piston rod 35 may take place either automatically or by hand.

What I claim is:

1. A welding device intended for touch-welding comprising two holders for welding rods, a common mounting for said rod holders, said two holders being mounted in parallel relationship to each other on said common mounting, supporting means for movably supporting said common mounting so that said common mounting and said two holders may be moved longitudinally of said common mounting as a unit whereby the position of one of said welding rod holders in regard to a work piece and including the angle therebetween may alternately be assumed by the other of said welding rod holders.

2. A welding device intended for touch-welding comprising two holders for welding rods, a common mounting for said rod holders, said two holders being mounted in parallel relationship to each other on said common mounting, supporting means for movably supporting said common mounting so that said common mounting and said two holders may be moved longitudinally of said mounting as a unit and pneumatic means for moving said unit whereby the position of one of said welding rod holders in regard to a work piece and including the angle therebetween may alternatively be assumed by the other of said welding rod holders.

3. A welding device intended for touch-welding comprising two holders for welding rods, a common mounting for said rod holders, said two holders being mounted in parallel relationship to each other on said common mounting, said two holders being extensible away from and retractable towards said common mounting, supporting means for movably supporting said common mounting so that said common mounting and said two holders may be moved longitudinally of said mounting as a unit and pneumatic means for moving said unit whereby the position of one of said welding rod holders in regard to a work piece and including the angle therebetween may alternately be assumed by the other of said welding rod holders.

4. A welding device intended for touch-welding according to claim 3 wherein additional pneumatic means are provided for retracting said holders.

5. A welding device intended for touch-welding according to claim 3 wherein additional pneumatic means are provided for retracting said holders, and fluid connections link said first mentioned pneumatic means and said additional pneumatic means.

6. A welding device intended for touch-welding according to claim 3 wherein additional pneumatic means are provided for retracting said holders, fluid connections link said first mentioned pneumatic means and said additional pneumatic means, and said fluid connections comprise valve means for causing the retraction of only one of said holders when the common mounting is caused to be moved longitudinally to one position and the retraction of the other one of said holders when the common mounting is caused to be moved longitudinally to another position.

7. A welding device intended for touch-welding comprising a casing movably mounted on a pair of rods, said rods entering through two walls of said casing at opposite ends thereof, piston elements defining two separate fluid-tight chambers with other walls in said casing, a pair of welding rod holder casings mounted transversely of said first casing, said pair of casings being arranged parallel to each other, a movable plunger extending into each of said pair of casings, a piston within each of said pair of casings and attached to each of said plungers, respectively, welding rod holders attached to each of said plungers, respectively, outside said pair of casings, a conduit connecting one of said chambers with one of said welding rod holder casings, a second conduit connecting the other of said chambers with the other of said welding rod holder casings, a valve casing, a third conduit connecting said first conduit with said valve casing, a fourth conduit connecting said second conduit with said valve casing, a fluid pressure conduit connected with said valve casing, said valve casing having two outlets venting to atmosphere, and valve means in said valve casing alternately operable to one position for introducing fluid pressure into one of said chambers and into one of said pair of casings while venting the other one of said chambers and the other one of said pair of casings through one of said outlets and to another position for venting said one of said chambers and said one of said pair of casings through one of said outlets while introducing fluid pressure into said other one of said chambers and said other one of said pair of casings whereby movement of said first casing in one direction will occur simultaneously with the retraction of one of said welding rod holders and movement of said first casing in the opposite direction will occur simultaneously with the retraction of the other of said welding rod holders.

HENDRIK JAN VAN DEN BERGE.
HENDRIK PIETER HUBEE.

REFERENCES CITED

The following references are of record in the file of this patent:

UNITED STATES PATENTS

| Number | Name | Date |
| --- | --- | --- |
| 1,904,112 | Achard | Apr. 18, 1933 |

FOREIGN PATENTS

| Number | Country | Date |
| --- | --- | --- |
| 358,608 | Great Britain | Oct, 15, 1931 |